Dec. 28, 1954 C. A. BOWLUS 2,698,127
HYDRAULIC TRANSMISSION UNIT, PUMP, OR COMPRESSOR
Filed April 6, 1949 2 Sheets-Sheet 1
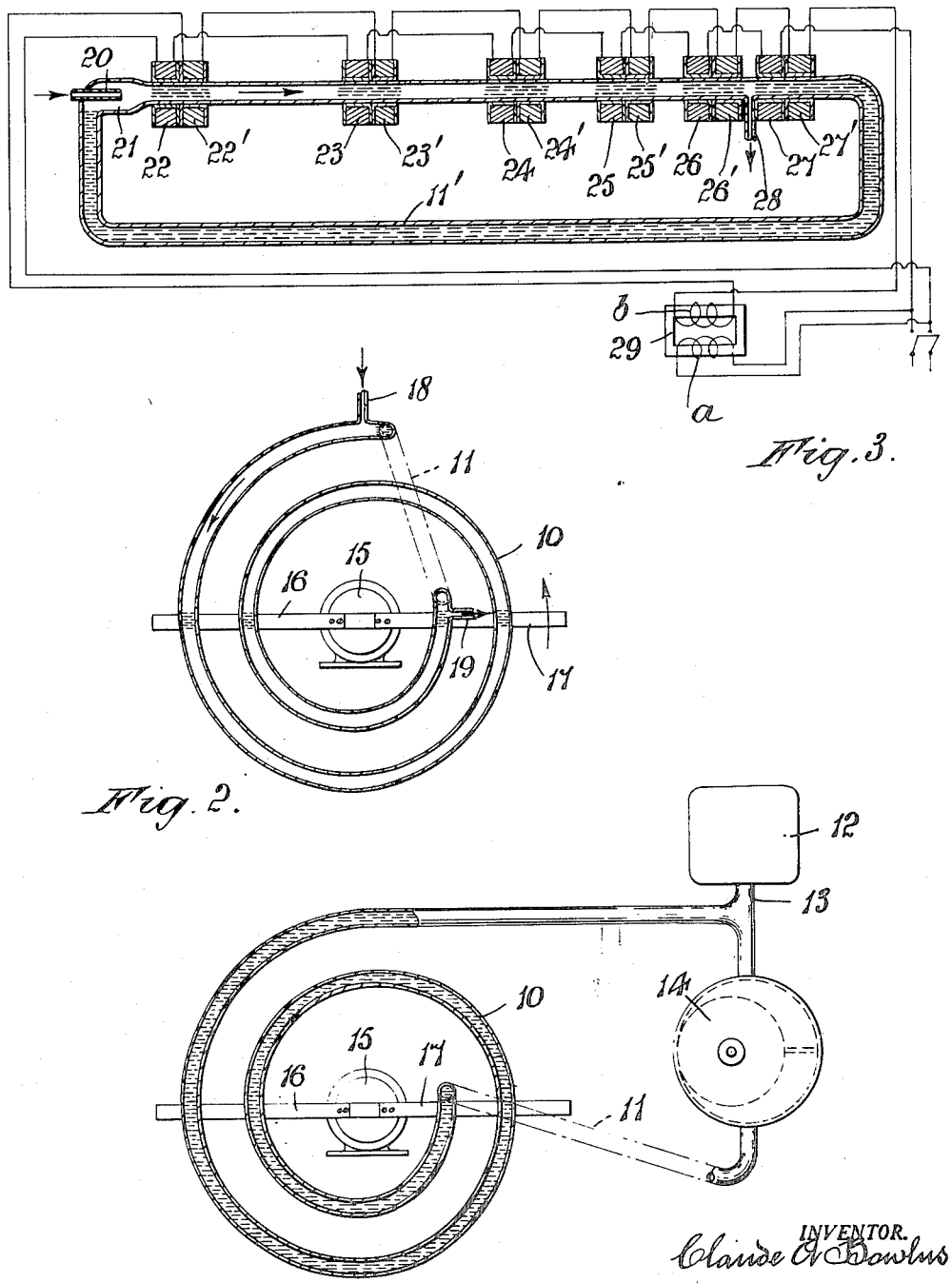

Dec. 28, 1954  C. A. BOWLUS  2,698,127
HYDRAULIC TRANSMISSION UNIT, PUMP, OR COMPRESSOR
Filed April 6, 1949  2 Sheets-Sheet 2

INVENTOR.
Claude A. Bowlus
BY
Stanley Lightfoot

United States Patent Office 2,698,127
Patented Dec. 28, 1954

2,698,127

HYDRAULIC TRANSMISSION UNIT, PUMP, OR COMPRESSOR

Claude A. Bowlus, Detroit, Mich.

Application April 6, 1949, Serial No. 85,818

9 Claims. (Cl. 230—1)

This invention relates to fluid pumps or compressors and has for its object to provide novel means for promoting motion in a liquid either for the transfer of the liquid from one point to another or for the transfer of a gaseous fluid by said liquid from one point to another.

More particularly the said invention proposes to promote the flow of fluid through the agency of magnetic means and to apply the magnetic influence in a manner eliminating the use of mechanisms within the pump or compressor for effecting the actual movement of the fluid therein.

Still further the said invention contemplates the confining of fluid charged with a magnetic material within a conduit of material length, and the progressive application of magnetic forces thereto along the length of said conduit in a manner to effect the urging of the magnetic charge of said fluid along said conduit, whereby the motion of said charge will produce a corresponding motion of said fluid through said conduit.

Still further the invention provides for the inducing or introduction of gaseous fluid into a liquid fluid charged with magnetic bodies in such a device, whereby the magnetically influenced motion of the liquid fluid will carry with it or pump the gaseous fluid to a required point of disposal whereupon it may be released from the liquid fluid.

Still further the said invention contemplates providing an arrangement wherein the application of the magnetic forces to a magnetically charged liquid fluid aerated with the gaseous fluid will effect a compression of said gaseous fluid prior to its release from said liquid fluid.

As an embodiment of the said invention may apply to a conduit containing the magnetically charged and aerated liquid as above referred to, a series of electric coils in a position to provide magnetic fields in said fluid, together with electrical phase-selecting means pairing certain of said coils with other of said coils in such phase relation as to produce a progressive closing together of masses of fluid-born magnetic material within the conduit, whereby to effect a progressive compression of gaseous fluid by the said masses of fluid-born magnetic material as they move along said conduit.

The invention also contemplates a refrigeration system incorporating the aforesaid means of compressing a gaseous refrigerant and passing the compressed refrigerant to a suitable evaporator in any of the manners commonly known in refrigerating systems, the novel compressing means eliminating the more or less complicated mechanisms usually employed for the purpose of compressing such a refrigerant.

Still further objects and advantages additional or subsidiary to the aforesaid objects, or resulting from the construction or operation of the invention as it may be carried into effect, will become apparent as the said invention is hereinafter further disclosed.

In carrying the said invention into effect I may utilize the novel construction arrangement of elements hereafter described, by way of example, having reference to the accompanying schematic drawings wherein:

Figure 1 illustrates a simple fluid pump or oil transmission device embodying the broad conception of the present invention;

Figure 2 is a similar view of such a device modified to effect the transmission and compression of the gaseous fluid;

Figure 3 illustrates a device embodying the said invention and arranged to compress a gaseous fluid, the said figure illustrating another electrical arrangement involving the use of paired coils arranged in a particular phase relation to permit the flow of fluid within the system in accordance with the present invention;

Figure 4:
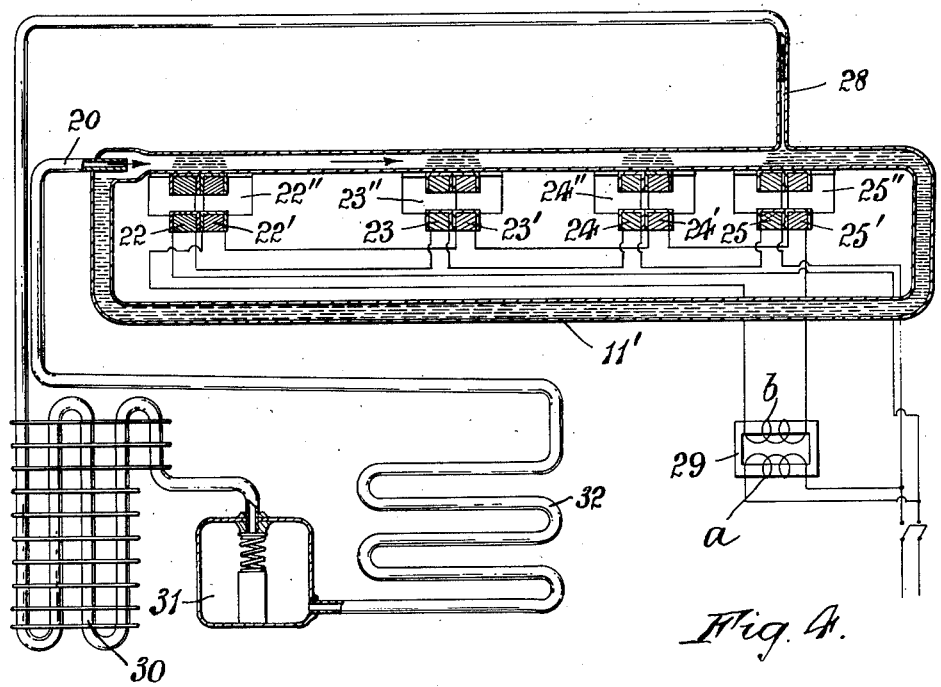
Figure 5:
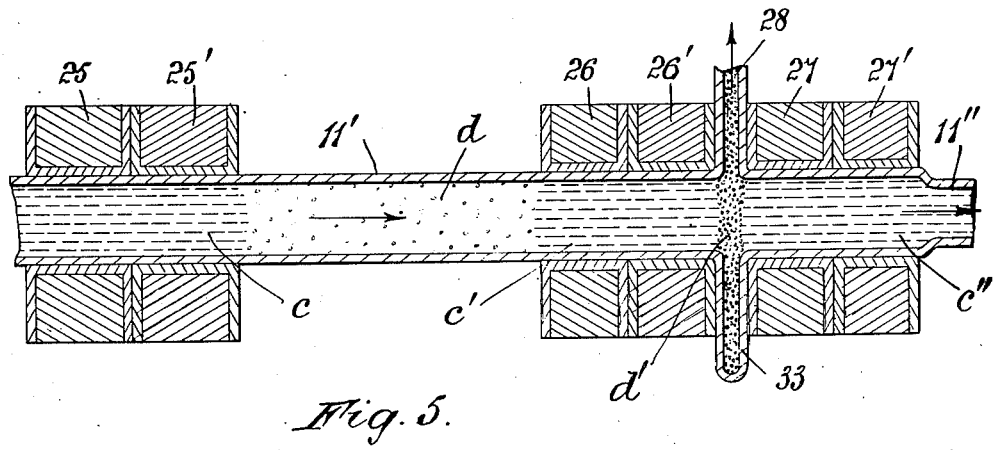

Figure 4 illustrates the incorporation of a form of such system with an arrangement of refrigerator coils for the purpose of compressing and controlling the flow of a gaseous refrigerant; and Figure 5 is a somewhat enlarged detailed view of a portion of the fluid conduit showing an arrangement of fluid propelling coils and one means of providing flow, the compression and separation of a gaseous fluid from the liquid fluid within the said conduit.

Referring first to Figure 1 of the drawing; a spiral conduit 10 is shown, the ends of which are coupled together, as by the pipe 11, either directly or indirectly, such as through the medium of a supply tank 12 for instance. In the said figure such a supply tank is shown as being fed by a branch 13, and, for the sake of this particular example, a motor 14 is shown as being interposed in the system to be driven by fluid moving through the system for any purpose which may be desired.

The said conduit or system is filled with a liquid fluid, such as oil, and this fluid is charged with particles or bodies of a magnetic material such as of a ferrous nature.

These bodies may be extremely finely divided, or may be quite sizeable, even to the extent that the magnetic bodies may be in the form of balls of a size more or less closely fitting the bore of the conduit.

A sufficient proportion of such magnetic bodies is incorporated in the liquid fluid, whereby motion in part of the said bodies will in turn be imparted to the fluid; so that by covering the bodies that travel along the conduit of the system, the fluid is also impelled in the same direction, and thus may be caused to operate the motor 14 as an example of its usefulness.

As will become apparent, however, the motion imparted to the oil or liquid fluid may be also utilized to effect the motion and compression of a gaseous fluid, as will become apparent.

To impart this motion to the oil or liquid fluid, I show in the Figure 1 a motor 15 arranged to rotate radially mounted magnets 16 and 17 about the axis of the said motor 15, whereby the said magnets will be caused to sweep the spiral conduit 10 as they are so rotated.

This movement of the magnets will tend to cause the movement therewith of the magnetic bodies carried by the oil or fluid within the conduit 10. Therefore, if the said magnets 16 and 17 be rotated in a counter-clockwise manner (as viewed in the drawing), then these magnetic bodies, and consequently the fluid in which they are embodied, will be caused to flow toward the center of the spiral and through the branch 11 thereof to the motor 14 or device to be operated, after passing through which the oil or fluid with its magnetic bodies will return to the outer coil of the conduit and the cycle of flow will be repeated.

Obviously, if the said magnets 16 and 17 be rotated in a clockwise direction, as viewed, the flow through the spiral conduit would be in the opposite direction.

Referring to Figure 2, it will be noted that the spiral conduit in this case is provided with a small inlet pipe at 18 and a small outlet pipe at 19, the inlet leading into the outermost coil of the spiral, and the outlet leads from the innermost coil thereof.

This spiral conduit is also filled with oil or fluid charged with magnetic bodies, and the inlet 18 is for the purpose of introducing a gaseous fluid to the liquid fluid within the conduit, whereby such gaseous fluid will be entrained in the flowing with the fluid. The outlet 19 is for the release of such gaseous fluid from the liquid fluid after it has passed through the intervening coils of the conduit.

The size and form of the inlet 18 and the outlet 19 is dependent upon the particular nature in which the gaseous fluid is to be handled and pressures to be obtained, and any method of valving or arrangements for the reception of the said gaseous fluid does not enter into this phase of the invention and is not dealt upon in detail herein. Sufficient to say that the outlet, of course, is so arranged that it does not permit the escape of the liquid fluid or of the magnetic bodies from the conduit system.

Where compression, as distinguished from mere movement of the gaseous fluid is sought, it is desirable that the outlet 19 be arranged from the smaller coil of the spiral conduit, as the rotation of the magnets 16 and 17 in an anticlockwise direction, as viewed in Figure 2, will sweep a greater length of the said conduit per unit time and per degree of rotation in the outer coils than in the inner coils of the said conduit. Thus, fluid moving under the magnetic influence of the movement of these magnets 16 and 17, as described, will be urged at a greater speed through the outer coils than through the inner coils of the spiral, so that a constantly increasing pressure will be exerted on gaseous fluid entrained in the liquid fluid within the coils as these fluids move toward the center of the spiral. Consequently such entrained gaseous fluid will be compressed by the liquid fluid and by the movement of the magnetic bodies therein tending to crowd together as they approach the central portions of the coil.

It should, however, be understood that this spiral arrangement is simply one of the means by which the movement of a fluid within a conduit, under the urging of magnetic bodies contained in the fluid, may be utilized as a means of effecting a compressing of an entrained gaseous fluid; and it will become apparent that the form of the fluid conduit and the form and arrangement of the magnetic means acting upon the magnetic bodies therein (and of the magnetic bodies themselves) admits of considerable variation.

In Figure 3 the conduit 11' is shown, for convenience of illustration, as being of a more or less oblong formation with a gaseous fluid inlet 20 opening into the said conduit in the manner of an aspirator, the bore of the conduit being somewhat expanded at 21 to accommodate this inlet 20.

Surrounding and spaced along a leg of the said conduit are a series of pairs of coils 22 and 22', 23 and 23', 24 and 24', 25 and 25', 26 and 26', and 27 and 27', the said conduit forming a continuous core for the said coils.

It will be noted that the several pairs of coils referred to are progressively spaced closer together along the conduit, so that the coil 26' and the coil 27 are much closer together than are the coils 22' and 23. A gaseous fluid outlet 28 from the conduit 11' is situated between the said coils 26' and 27.

29 indicates a phase-shifting device of any type which is schematically shown as a transformer provided with windings $a$ and $b$; and the coils 22, 23, 24, 25, 26, and 27 are shown as being connected in parallel with the primary winding $a$, whereas the coils 22', 23', 24', 25', 26' and 27' are similarly connected to the secondary winding $b$ of the phase-shifting transformer. Thus, each coil of a pair is energized in a differing phase relation one to the other, to provide a magnetic lag between the second coil as related to the first coil of each pair. In other words, there is a magnetic lag between the coil 22' and the coil 22, as there is between coil 27' and the coil 27. In this way a magnetic field is set up within the conduit 11', which field will progress along the said conduit in a direction from the gaseous fluid inlet 20 to the outlet 28.

Then it will be seen that if the liquid fluid within the conduit 11' be charged with magnetic bodies capable of motion through the conduit, these magnetic bodies will be impelled through the conduit in a direction, indicated by the arrow therein, and therefore around the conduit in a continuous cycle, thus promoting a similar flow of the liquid fluid within the conduit, and of entrained gaseous fluid which has been drawn into the conduit through the inlet 20.

It will also be observed that the free-moving magnetic bodies carried by the liquid fluid in the conduit will have a tendency to mass within the magnetic fields of each of the pairs of coils described and thus shown more or less diagrammatically in the said Figure 3 by the localized shading within the said conduit. The magnetic bodies may be more or less evenly distributed throughout that part of the conduit which is not directly under the influence of the pairs of coils.

As a result of this massing of the magnetic bodies, gaseous fluid entrained in the liquid fluid within the conduit is more or less trapped between such masses, so that, due to the progressively decreasing spacing between the pairs of coils along the conduit, this trapped gaseous fluid is progressively compressed as the spacing between adjacent masses decreases progressively as the liquid fluid with its massed magnetic bodies is impelled along the conduit by the stepped energizing of the coils in the manner described. Consequently, as a result of this progressive compression of the entrained gaseous fluid, a considerable compression thereof may be obtained by the time it reaches the outlet 28, at which point such compressed gaseous fluid may be bled off in any suitable manner.

Such a gaseous fluid so compressed may be in the form of a refrigerant, and the application of a device such as that described to a simple form of refrigeration system is shown in Figure 4, wherein a somewhat different application of the magnetizing coils to the conduit 11' is shown for the purpose of indicating the possibility of variation of the application of magnetic energizing means thereto.

In this example, Figure 4, the pairs of coils are shown as being arranged independently of the conduit 11' instead of the conduit actually passing through the centers of the coils; an arrangement which lends itself to simple application of the coil system to a conduit or the replacement of the coils if thought necessary or desirable.

In this arrangement the coils 22 and 22' are provided with a core 22", the end poles of which are directed toward the conduit as clearly shown. Similarly the coils 23 and 23' are provided with a core 23", 24 and 24' with the core 24", and 25 and 25' with the core 25". The split-phase energizing of the respective coils is shown as being effected by the operation of the phase-splitting transformer 29, as in the arrangement, Figure 3.

The outlet 28, in Figure 4, is shown as being connected with the condenser coils 30 leading to a receiver 31 for compressed or liquified refrigerant. 32 indicates an evaporator to which such compressed or liquified refrigerant is passed, and from which the gaseous refrigerant passes back through the tube 20 to the interior of the conduit 11'.

Obviously the representation of the refrigeration system does not include the refinements of detail that are common to such systems or necessary to meet the controlling requirements of particular refrigerants.

Figure 5 illustrates on a larger scale a portion of a conduit wherein the liquid fluid charged with the magnetic bodies, more or less massed together by electro-magnetic means, is shown at $c$, $c'$ and $c''$, the entrained gaseous fluid being indicated at $d$ and $d'$ in a partially compressed and in a more completely compressed condition respectively. A restricted trap is shown at 33 between the coils 26' and 27 to accommodate and effect the separation of accumulated compressed gaseous fluid (which may at this stage actually approach the condition of a liquified gas), the aforesaid outlet 28 opening from this chamber 33.

I also show in this Figure 5 a restriction 11" in the bore of the conduit 11' positioned to offer a resistance at any strategic point to the flow of the liquid fluid therethrough, whereby to promote the compression of entrained gaseous fluid in the moving stream.

It will be apparent from the foregoing examples that this invention broadly resides in the novel means of securing an impelled flow of a liquid fluid, through a more or less closed path within a conduit, by the application of magnetic impulses to magnetic bodies carried by or incorporated in the fluid, and that such magnetic impulses may be of a continuous or of a pulsating nature, mechanically or electrically controlled as to shifting of the magnetic field or fields along the conduit; the invention still further contemplating the novel means of magnetically bringing about the compression of a gaseous fluid by entraining such gaseous fluid in the liquid fluid of such a system and magnetically controlling the flow of liquid-born magnetic bodies in such a system in a manner compressing the entrained gaseous fluid, which may be released from the system after being so compressed.

It will also be clearly apparent that the induced motion of the liquid fluid, and of the gaseous fluid where this is introduced, may be utilized as a means of transfer of these fluids from one point to another or for the application of power resulting from such motion of the fluid or fluids in any manner or for any purpose which may be required.

This invention may be developed within the scope of the following claims without departing from the essential features of the said invention, and it is desired that the specification and drawing be read as being merely illustrative of a practical embodiment of the same and not in a strictly limiting sense.

What I claim is:

1. In a device of the type described a tubular walled passage, a liquid within said passage, magnetic bodies movable along said passage within said liquid, magnet means imposing a magnetic field on said bodies, means for shifting said field longitudinally of said passage to promote motion of said bodies and consequently of said liquid along said passage, and widely spaced gaseous fluid inlet and outlet means opening into and out of said walled passage.

2. In a device of the type described a tubular walled passage, a liquid within said passage, magnetic bodies movable along said passage within said liquid, movable magnet means imposing a magnetic field on said bodies, means for shifting said field longitudinally of said passage to promote motion of said bodies and consequently of said liquid along said passage, and widely spaced gaseous fluid inlet and outlet means opening into and out of said walled passage.

3. In a device of the type described a tubular walled spiral passage, a liquid within said passage, magnetic bodies movable along said passage within said liquid, magnet means imposing a magnetic field on said bodies, means for shifting said field longitudinally of said passage to promote motion of said bodies and consequently of said liquid along said passage, and widely spaced gaseous fluid inlet and outlet means opening into and out of said walled passage.

4. In a device of the type described a tubular walled spiral passage, a liquid within said passage, magnetic bodies movable along said passage within said liquid, movable magnet means imposing a magnetic field on said bodies, means for shifting said field longitudinally of said passage to promote motion of said bodies and consequently of said liquid along said passage, and widely spaced gaseous fluid inlet and outlet means opening into and out of said walled passage.

5. In a device of the type described a tubular walled spiral passage, a liquid within said passage, magnetic bodies movable along said passage within said liquid, magnet means imposing a magnetic field on said bodies, means for shifting said field longitudinally of said passage in a direction from the outer to the inner coils of said spiral to promote motion of said bodies and consequently of said liquid along said passage, a gaseous fluid inlet to an outer coil of said spiral walled passage, and a gaseous fluid outlet from an inner coil thereof.

6. In a device of the type described a tubular walled passage, a liquid within said passage, magnetic bodies movable along said passage within said liquid, a plurality of magnet coils arranged to impose magnetic fields on said bodies, means for energizing said coils in shifting phase relation to promote the progressive motion of said bodies and consequently of said liquid along said passage, and widely spaced gaseous fluid inlet and outlet means opening into and out of said walled passage, said coils being situated between said inlet and outlet means.

7. In a device of the type described a tubular walled passage, a liquid within said passage, magnetic bodies movable along said passage within said liquid, a plurality of pairs of magnet coils arranged to impose magnetic fields on said bodies, means for energizing the individual coils of each pair in shifting phase relation to promote the progressive motion of said bodies and consequently of said liquid along said passage, and widely spaced gaseous fluid inlet and outlet means opening into and out of said walled passage, said coils being situated between said inlet and outlet means.

8. In a device of the type described a tubular walled passage, a liquid within said passage, magnetic bodies movable along said passage within said liquid, a plurality of magnet coils arranged in unevenly spaced order to impose magnetic fields on said bodies, means for energizing said coils in shifting phase relation to promote motion of said bodies and consequently of said liquid along said passage, and widely spaced gaseous fluid inlet and outlet means opening into and out of said walled passage, said coils being situated between said inlet and outlet means.

9. In a device of the type described a tubular walled passage, a liquid within said passage, magnetic bodies movable along said passage within said liquid, a plurality of pairs of magnet coils arranged in unevenly spaced order to impose magnetic fields on said bodies, means for energizing the individual coils of each pair in shifting phase relation to promote motion of said bodies and consequently of said liquid along said passage, and widely spaced gaseous fluid inlet and outlet means opening into and out of said walled passage, said coils being situated between said inlet and outlet means.

References Cited in the file of this patent

UNITED STATES PATENTS

| Number | Name | Date |
|---|---|---|
| 1,298,664 | Chubb | Apr. 1, 1919 |
| 2,224,505 | Unger | Dec. 10, 1940 |
| 2,397,785 | Freidlander | Apr. 2, 1946 |
| 2,415,376 | Strickland, Jr. | Feb. 4, 1947 |
| 2,425,520 | Dutoit | Aug. 12, 1947 |
| 2,434,705 | Lago | Jan. 20, 1948 |
| 2,645,279 | Rossman | July 14, 1953 |
| 2,651,258 | Pierce | Sept. 8, 1953 |